United States Patent [19]
Nagano et al.

[11] Patent Number: 5,245,371
[45] Date of Patent: Sep. 14, 1993

[54] CAMERA PROVIDED WITH A VISUAL AXIS DIRECTION DETECTING PORTION

[75] Inventors: Akihiko Nagano, Kawasaki; Akira Yamada, Yokohama; Kazuki Konishi, Tokyo, all of Japan

[73] Assignee: Canon Kabushiki Kaisha, Tokyo, Japan

[21] Appl. No.: 832,369

[22] Filed: Feb. 7, 1992

[30] Foreign Application Priority Data

Feb. 8, 1991 [JP] Japan .................................. 3-17634
Jul. 10, 1991 [JP] Japan .................................. 3-170072

[51] Int. Cl.⁵ .......................... G03B 13/02; G03B 5/00
[52] U.S. Cl. .................................. 354/62; 354/219; 354/195.1
[58] Field of Search ............... 354/219, 222, 224, 225, 354/199, 195.1, 195.12, 62; 351/210

[56] References Cited
FOREIGN PATENT DOCUMENTS
61-172552 8/1986 Japan.

*Primary Examiner*—W. B. Perkey
*Attorney, Agent, or Firm*—Fitzpatrick, Cella, Harper & Scinto

[57] ABSTRACT

A camera is provided with observation means for observing a scene therethrough, a visual axis detecting device for detecting the visual axis direction of the eye of an operator looking into the observation means, an information receiving device for receiving the information of an objective lens, and a control device for making the control of the visual axis detecting device differ on the basis of a signal from the information receiving device.

19 Claims, 11 Drawing Sheets

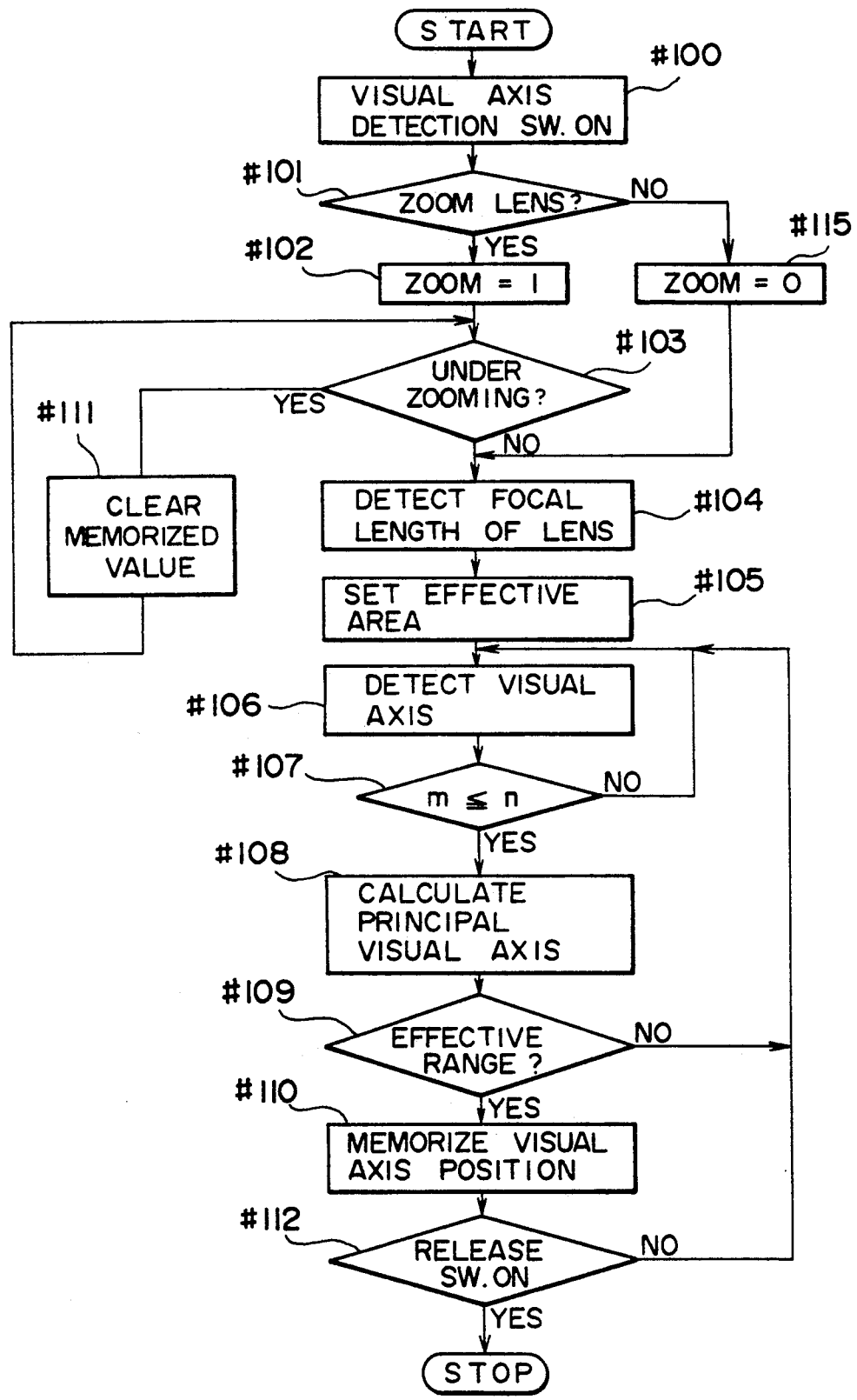

CAMERA PROVIDED WITH A VISUAL AXIS DIRECTION DETECTING PORTION

BACKGROUND OF THE INVENTION

1. Field of the Invention

This invention relates to a camera for silver halide film, a still video camera or an ordinary video camera having a visual axis detecting device capable of detecting a view point (visual axis) being observed by an observer (photographer) on an observation plane on which the object image by a photo-taking system is appearing.

2. Related Background Art

There have heretofore been proposed various devices for detecting what position on an observation plane an observer is observing, i.e., for detecting the so-called visual axis. For example, in Japanese Patent Application Laid-Open No. 61-172552, there is described a device in which a parallel light beam from a light source is projected onto the front eye part of an observer's eyeball and the visual axis is found by the utilization of the imaged positions of the corneal reflected image by reflecting light from a cornea and a pupil. FIG. 6 of the accompanying drawings illustrates a visual axis detecting method, FIG. 6A being a schematic view of a visual axis detecting optical system, and FIG. 6B showing the output signal of a photoelectric element array 6. In FIG. 6, the reference numeral 5 designates a light source, such as a light emitting diode, which emits infrared light not sensed by the observer and which is disposed on the focal plane of a light projecting lens 3.

The infrared light emitted from the light source 5 is collimated by the light projecting lens 3, is reflected by a half mirror 2 and illuminates the cornea 21 of the eyeball. At this time, the reflected light source image (virtual image) d by part of the infrared light reflected by the surface of the cornea 21 is transmitted through the half mirror 2, is condensed by a light receiving lens 4 and is projected onto a position d' on the photoelectric element array 6.

Also, light beams from the end portions a and b of an iris 23 form the images of these end portions a and b at positions a' and b' on the photoelectric element array 6 through the light receiving lens 4. Where the rotation angle $\theta$ of the optical axis T of the eyeball relative to the optical axis of the light receiving lens 4 (optical axis S) is small, when the Z coordinates of the end portions a and b of the iris 23 are Za and Zb, respectively, the coordinates Zc of the central position c of the pupil 24 are expressed as $$Zc \simeq (Za+Zb)/2.$$

Also, the Z coordinates of the reflected light source image d and the Z coordinates of the center of curvature O of the cornea 21 coincide with each other and therefore, when the Z coordinates of the created position d of the reflected light source image d are Zd and the distance between the center of curvature O of the cornea 21 and the center C of the pupil 24 is $\overline{OC}$, the rotation angle $\theta$ of the optical axis T of the eyeball substantially satisfies the following relational expression:

$$\overline{OC} \cdot \mathrm{SIN}\theta \simeq Zc - Zd. \tag{1}$$

Therefore, in a calculation processing device 9, the positions of particular points (the reflected light source image d and the end portions a and b of the iris) projected onto the photoelectric element array 6 as shown in FIG. 6B are detected, whereby the rotation angle $\theta$ of the optical axis T of the eyeball can be found. At this time, expression (1) is rewritten into $$\beta \cdot \overline{OC} \cdot \mathrm{SIN}\theta \simeq (Za'+Zb')/2 - Zd', \tag{2}$$

where $\beta$ is a magnification determined by the position of the eyeball relative to the light receiving lens 4.

Further, when the rotation angle $\theta$ of the optical axis of the observer's eyeball is calculated, the deflection of the visual axis relative to the optical axis of the eyeball is corrected, whereby the observer's visual axis is found. Also, in FIG. 6, there is shown an example in which the observer's eyeball rotates in the Z-X plane (for example, a horizontal plane), but the visual axis is also detectable when the observer's eyeball rotates in the X-Y plane (for example, a vertical plane), and an example of such method is also described in the aforementioned Japanese Patent Application Laid-Open No. 61-172552.

FIG. 7 of the accompanying drawings is a schematic view of the essential portions of a single-lens reflex camera when a visual axis detecting device is disposed in the camera. The object light transmitted through a photo-taking lens 101 is reflected by a retractable quick return mirror 102 and is imaged near the focal plane of a focusing screen 104. Further, the object light diffused by the focusing screen 104 is directed to the photographer's eye point through a condenser lens 105, a pentagonal prism 106 and an eyepiece 1. The visual axis detecting optical system is comprised of an illuminating optical system comprising a light source 5, such as an infrared light emitting diode emitting infrared light, not sensed by the photographer (observer) and a light projecting lens 3, and a light receiving optical system comprising a photoelectric element array 6 and a light receiving lens 4, and is disposed above the eyepiece 1 serving also as a dichroic mirror. The infrared light emitted from the infrared light emitting diode 5 is reflected on the dichroic mirror surface 1a and illuminates the photographer's eyeball. Further, a part of the infrared light reflected by the eyeball is again reflected by the dichroic mirror surface 1a and is condensed on the photoelectric element array 6 through the light receiving lens 4. From the image information from the eyeball (FIG. 6B) obtained on the photoelectric element array 6, the direction of the photographer's visual axis is calculated in the calculation processing device 9.

In this manner in a single-lens reflex camera, it is possible to know which point on the focusing screen the photographer is observing, in the case, for example, of a camera having a focus detecting device capable of accomplishing the focus detection of a plurality of points in the finder image field, it is effective, when the photographer tries to select one of points capable of focus detection which coincides with the main object (the object the photographer is going to photograph) and effect automatic focus detection, for saving the trouble of selecting and inputting one of those points, regarding the point being observed by the photographer as the point for focus detection to be effected, and automatically select said point to thereby effect automatic focus detection.

Now, it is usual for the recent single-lens reflex cameras to be used with a zoom lens mounted thereon, and the photographer zooms the lens to the telephoto or the wide-angle side in conformity with an object to be photographed to thereby determine the composition. Also, the movement of the photographer's visual axis and its distribution depend on the object to be photographed, and when for example, landscape is to be photographed, the photographer's visual axis moves substantially uniformly in the photographing image field, and when a person or the like in the foreground are to be photographed, the photographer's visual axis substantially concentrates upon the person to be photographed. Therefore, correlations can be found between the movement of the photographer's visual axis and its distribution and the then focal length of the lens.

In an interchangeable lens system, it is conceivable to mount a special lens, such as a macroscopic lenses or a fish-eye lens, in addition to ordinary lenses. It should also be taken into account that various adapters are sometimes mounted between a photo-taking lens and a camera body.

On the other hand, the photographer usually manually zoom a zooms lens mounted on a camera to the telephoto side or the wide-angle side to thereby determine the composition so that the size of an object to be photographed in the photographing image field may be a desired size. Recently, there have also beer realized commercially available cameras having the function of detecting the distance of an object and sending a signal from the camera body to the lens side so that the size of the object relative to the photographing image field may be constant, thereby automatically changing the focal length of the lens, and such cameras save the photographer the trouble of operating the zoom lens.

However, in a camera of this kind, the focal length of the lens thereof is set on the basis of the distance of an object detected by the camera body and therefore, when the object to be detected is mistaken, or when a plurality of objects are to be photographed at one time, or when the size of the object extremely differs from the size supposed during designing, there is the possibility of the lens being set to a wrong focal length.

SUMMARY OF THE INVENTION

It is a first object of the present invention to better the matching of the use of a photo-taking lens or the interchange use of lenses of different focal lengths capable of being zoomed relative to a camera body provided with a visual axis detecting device for detecting the visual axis of an operator seeing a desired object in a scene, and more preferably provided with a focus detecting device capable of detecting the focus state for a desired object in a scene.

It is a second object of the present invention to detect the inherent information of a photo-taking lens mounted on a camera body and to make the control of the visual axis detecting device differ on the basis of this information.

It is a third object of the present invention to mitigate a reduction in detecting capability which is liable to occur when the position of a main object the photographer wants to photograph is detected from only the movement of the visual axis and the distribution information of the view point.

It is a fourth object of the present invention to mitigate a reduction in the capability of detecting a main object when a photo-taking lens of a certain kind is mounted on a camera body or various adapters are mounted between a photo-taking lens and a camera body.

It is a fifth object of the present invention to provide, in a camera having a visual axis detecting device for detecting the visual axis of an observer looking into a finder, by paying attention to the fact that there is a correlation between an object to be photographed and the then focal length (angle of view) of a lens and that the movement of the photographer's visual axis and its distribution depend on the kind and size of the object to be photographed, means for controlling the focal length of a zoom lens mounted on said camera, by the use of visual axis information detected by said visual axis detecting device, thereby always setting the focal length of the zoom lens correctly.

BRIEF DESCRIPTION OF THE DRAWINGS

FIG. 3 is a flowchart of the embodiment.

DETAILED DESCRIPTION OF THE PREFERRED EMBODIMENTS

Figure 1:
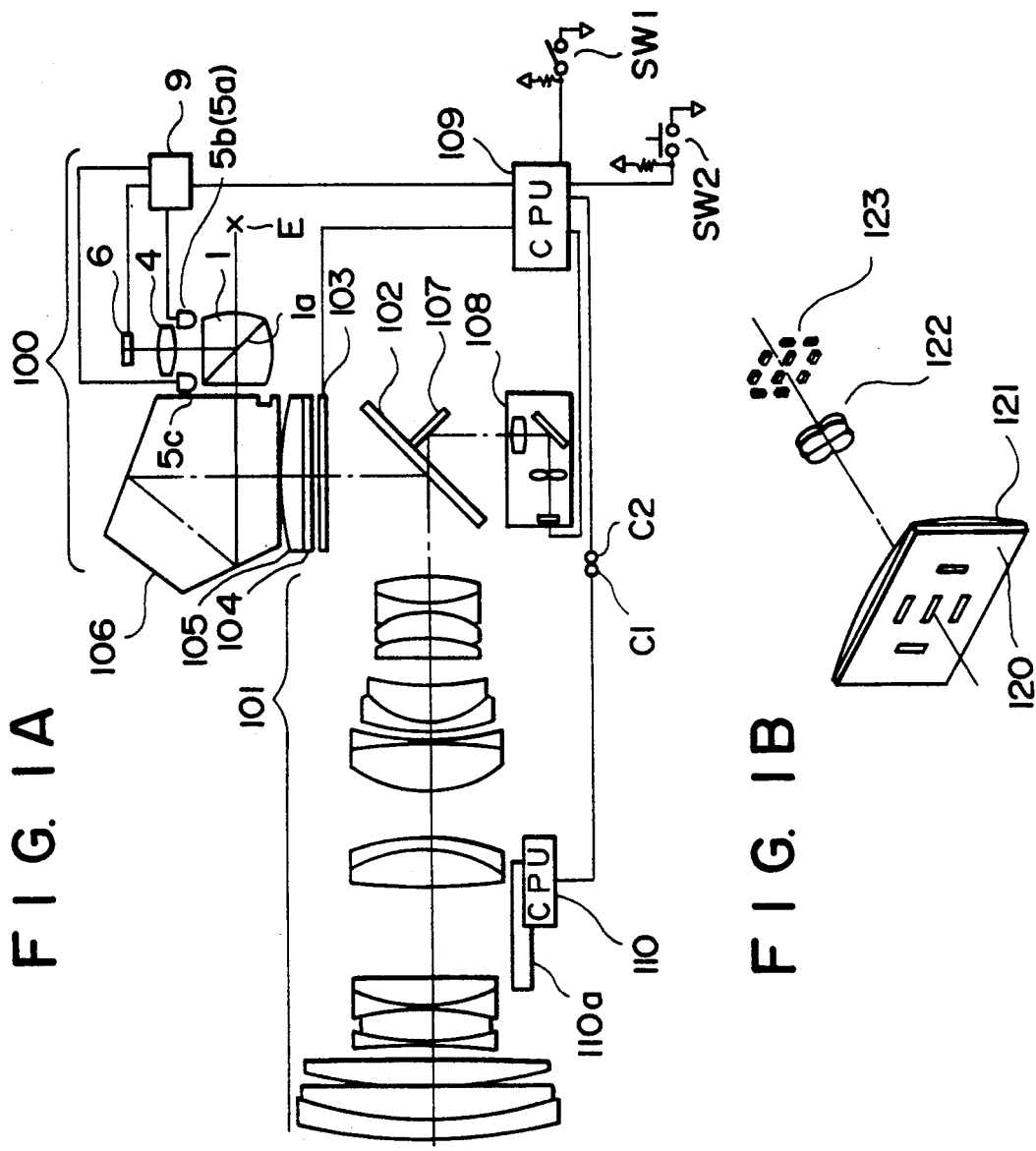
FIG. 1A is an optical cross-sectional view of an embodiment of the present invention.
FIG. 1B is a perspective view of a focus detecting device.
Figure 2:
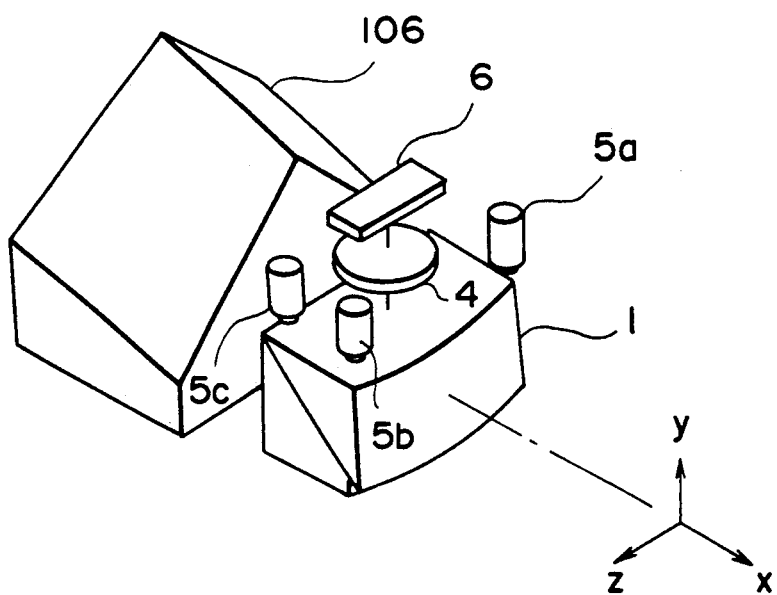
FIG. 2 is a perspective view of the optical arrangement of a visual axis detecting device.

FIGS. 1 to 4 show a first embodiment of the present invention, FIG. 1A being a schematic view of a single-lens reflex camera, FIG. 1B being a perspective view of the essential portions of a focus detecting device, and FIG. 2 being a perspective view of the essential portions of a visual axis detecting device. In these figures, the reference numeral 100 designates a camera body, and the reference numeral 1 denotes an eyepiece having an obliquely provided dichroic mirror 1a transmitting visible light therethrough and reflecting infrared light. The eyepiece 1 serves also as a beam splitter. The reference numeral 4 designates a light receiving lens, the reference characters 5a, 5b and 5c denote infrared light emitting diodes which are illuminating light sources, and the reference numeral 6 designates an image sensor comprising a photoelectric element array disposed two-dimensionally. The image sensor 6 is disposed so as to be conjugate with the vicinity of the pupil of an eye lying at a predetermined position with respect to the light receiving lens 4 and the eyepiece 1. The reference numeral 9 denotes a calculation processing device. Also, in FIG. 2, the infrared light emitting diodes 5a, 5b and 5c for illumination are used in one set of two diodes to detect the distance between the camera and an observer's eyeball, and the set of infrared light emitting diodes (5a and 5b; lateral position) or (5b and 5c; longitudinal position) is selected in conformity with the posture of the camera. Although not shown in these figures, detecting means for detecting the posture of the camera may effectively be posture detecting means utilizing mercury-switch or the like. Further, the reference numeral 101 designates a photo-taking lens (zoom lens) having a plurality of lenses movable for zooming, and removably mounted on or secured to the camera body. The reference numeral 102 denotes a movable mirror, the reference numeral 103 designates an display element, the reference numeral 104 denotes a focusing screen, the reference numeral 105 designates a condenser lens, the reference numeral 106 denotes a pentagonal prism, the reference numeral 107 designates a submirror for focus detection, the reference numeral 108 denotes a multipoint focus detecting device, and the reference numeral 109 designates a camera control device. On the other hand, the reference numeral 110 denotes a lens control device for detecting the zooming operation by a zoom encoder 110a and controlling lens driving, and having a memory function. The camera control device 109 and the lens control device 110 effect communication therebetween through their contacts C1 and C2 adapted to contact with each other when the photo-taking lens 101 is mounted on the camera body 100.

A detailed description of the multipoint focus detecting device 108 is not important for the understanding of the present invention and is therefore restricted to an outline herein. A field mask 120 disposed near the predetermined imaging plane of the photo-taking lens 101 as depicted in FIG. 1A and having a plurality of slits determining focus detection areas as depicted in FIG. 1B, and a lens member 121 acting as a field lens for images in the slits are disposed in proximity to each other, and a group 122 of re-imaging lenses and a group 123 of photoelectric element arrays corresponding in number to the slits are disposed in the named order. The slits, the field lens, the set of re-imaging lenses and the set of photoelectric element arrays together constitute a well-known focus detecting system. In FIG. 1B, the mirror shown in the multipoint focus detecting device 108 of FIG. 1A is not shown.

Part of the object light transmitted through the photo-taking lens 101 is reflected by the movable mirror 102 and is imaged near the focusing screen 104. The object light reflected by the diffusing surface of the focusing screen 104 is directed to an eye point through the condenser lens 105, the pentagonal prism 106 and the eyepiece 1. The photographer effects framing while observing the object image projected onto the focusing screen 104, and at this time, the photographer's visual axis is moving about the object to be photographed. The display element 103 is, for example, a guest-host type liquid crystal element of a two-layer type which does not use a polarizing plate, and indicates the focus detection areas in the finder field.

Part of the object light transmitted through the photo-taking lens 101 is transmitted through the movable mirror 102, is reflected by the sub-mirror 107 and is directed to the multipoint focus detecting device disposed at the bottom of the camera body. In the multipoint focus detecting device 108, the focus adjusted state of the area corresponding to a focus detection area signal put out from the camera control device 109 is detected on the basis of said focus detection area signal.

The visual axis detecting device according to the present embodiment is comprised of a visual axis detecting optical system comprising members designated by the reference numerals 1 and 4–6, and the calculation processing device 9 for calculating the photographer's visual axis. However, the CPU 109 may serve also as the calculation processing device 9. The infrared light emitted from the infrared light emitting diodes 5a and 5b enters the eyepiece 1, is partly reflected by the dichroic mirror 1a and illuminates the observer's eyeball, not shown, which is situated near the eye point. Also, the infrared light reflected by the eyeball is reflected by the dichroic mirror 1a and forms an image on the image sensor 6 while being converged by the light receiving lens 4. The visual axis detecting method in the present embodiment will be described later.

FIG. 3 is a flowchart of the visual axis detection of the camera having the visual axis detecting device according to the present invention. When a visual axis detection starting switch SW attached to the camera body 100 or the photo-taking lens 101 is closed (#100), the camera control device 109 effects a communication with the memory portion of the lens control device 110 for the photo-taking lens 101 through the contacts C1 and C2, and discriminates whether the photo-taking lens 101 is a zoom lens (#101). When it is discriminated that the photo-taking lens 101 is a zoom lens (#102), the camera control device 109 effects a communication with the zoom encoder portion of the lens control device 110 and detects whether the photo-taking lens is under the zooming operation (#103). When it is discriminated that the photo-taking lens 101 is not under the zooming operation, the calculation processing device 9 likewise effects a communication with the zoom encoder portion of the lens control device 110 through the camera control device 109 and detects the focal length of the photo-taking lens 101 (#104).

Also, if the photo-taking lens 101 is not a zoom lens (#115), the calculation processing device 9 immediately effects a communication with the memory portion of the lens control device 110 for the photo-taking lens 101 through the camera control device 109, and detects the inherent focal length of the photo-taking lens 101 (#104). Further, the calculation processing device 9 sets the effective area during visual axis detection on the basis of the focal length information of the lens obtained by the camera control device 109 (#105). For example, if the focal length of the photo-taking lens is short, the effective area of visual axis detection is set widely, and if conversely, the focal length of the photo-taking lens is long, the effective area of visual axis detection is set narrowly. When the effective area of the visual axis is set, the camera control device 109 sends a visual axis detection starting signal to the calculation processing device 9 and visual axis detection is executed (#106).

Figure 8:
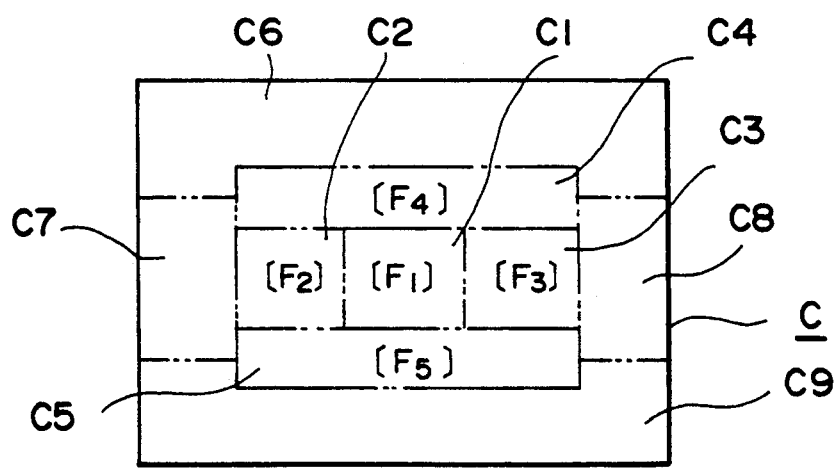
FIG. 8 shows a divided observation field.

The visual axis detection of this step 106 detects in which of areas $C_1$–$C_9$ in FIG. 8 the visual axis exists for each predetermined number of sampling pules. The following description will be continued with the sampling pules being defined, for example, as 20 pulses for one second.

How many times in the predetermined number (20 pulses) the visual axis has been situated in each of the areas $C_1$–$C_9$ is found, and one of the areas $C_1$–$C_9$ in which to a threshold value m (e.g. 4 times), the number of times n over which the visual axis has actually been situated assumes the relation than $m \leq n$ is calculated as the principal visual axis position (the eye gaze axis)

(#107 and #108). The number of the areas of the principal visual axis position is sometimes one, sometimes plural, and sometimes zero.

Whether the area found at the step 108 in which the principal visual axis is situated is the effective area set at the step 105 is judged (#109), and only the area or areas in the effective range are memorized.

Thereafter, the operation of steps 106 - 110 is repeatedly performed so that at the step 110, the latest area information of the principal visual axis position may always be memorized. Thus, the latest visual axis information is memorized whenever a release switch SW2 (see FIG. 1) is closed and the release operation (the movement of the movable mirror 102 to the retracted position, the stop-down of the aperture in the lens, the shutter opening-closing operation, etc.) is performed. By the closing of the release switch SW2, the camera control device 109 sends a detection stopping signal to the calculation processing device 9 to thereby stop visual axis detection (#112). With regard to the memorized information of the step 110 (the area information), when the focus mode is a one shot mode (once focused, the auto focus operation is stopped in that state), it will also be effective to make the memorized information fixed at a point of time whereat a focus detection area (at least one of $F_1$-$F_5$) corresponding to the memorized area is focused, and stops the operation of the subsequent steps 106–110.

In the above-described flowchart, if the lens is under zooming, advance is made to a step 111, where the memorized information of the step 110 is once cancelled and the stopping of the zooming operation is awaited.

The camera control device 109 causes the display element 103 to indicate in the finder one of the focus detection areas $F_1$-$F_5$ shown in FIG. 8 which corresponds to the position P of the detected main object, and also receives the focus adjustment information of said focus detection area from the multipoint focus detecting device 108, and further sends this focus adjustment information in the selected focus detection area to the lens control device 110, thus effecting the focus adjustment of the photo-taking lens 101.

The step 105 which is a characteristic in the above-described flow chart will hereinafter be described in detail. This step 105 is one which changes the effective area during visual axis detection on the basis of the focal length information of the photo-taking lens 101 detected at the step 104. Specifically, as shown in FIG. 8, for the focal length of 20-85 mm of the phototaking lens 101, the whole area $C_1+C_2+C_3+\ldots C_9$ in the finder image field is the effective area, and for the focal length of 86-200 mm, the area $C_1+C_2+C_3+C_4+C_5$ is the effective area, and for the focal length of 201 mm or more, the area $C_1+C_2+C_3$ is the effective area. This, is determined from the way of viewing the image that if the focal length is short, the whole of the finder image field (the photographing image field) becomes the main object as when the object to be photographed is landscape and if the focal length becomes long, the main object such as a person becomes often situated near the center.

It is because on the telephoto, size the object to be photographed is often sports or a car race and the movement of the main object is often lateral that among the fine focus detection area $F_1$-$F_5$, only the laterally arranged focus detection area $F_1$-$F_3$ are designated so as to be included in the area $C_4$, and therefore, the design is made from the necessity of effecting focus detection accurately for the main object such that only the focus detection areas in the lateral direction work. Thus, the effective utilization of visual axis detection can be accomplished even when the main object is moving.

Figure 4A:
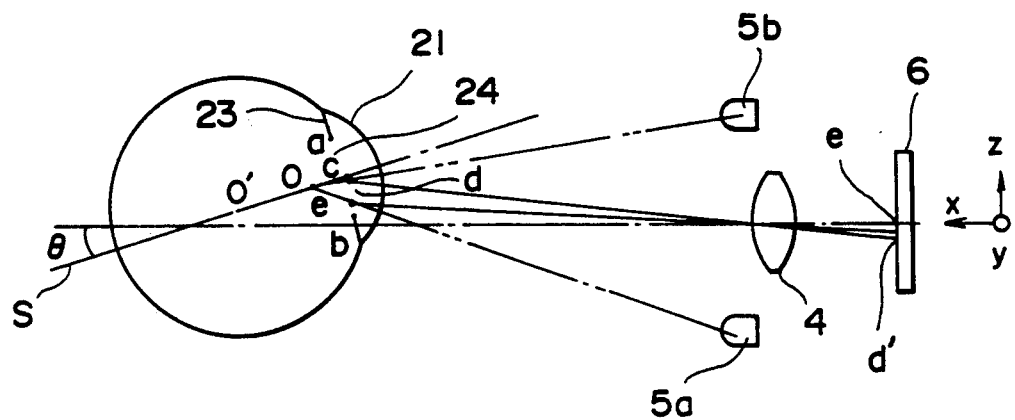
FIG. 4A illustrates a visual axis detecting method according to the embodiment.
Figure 4B:
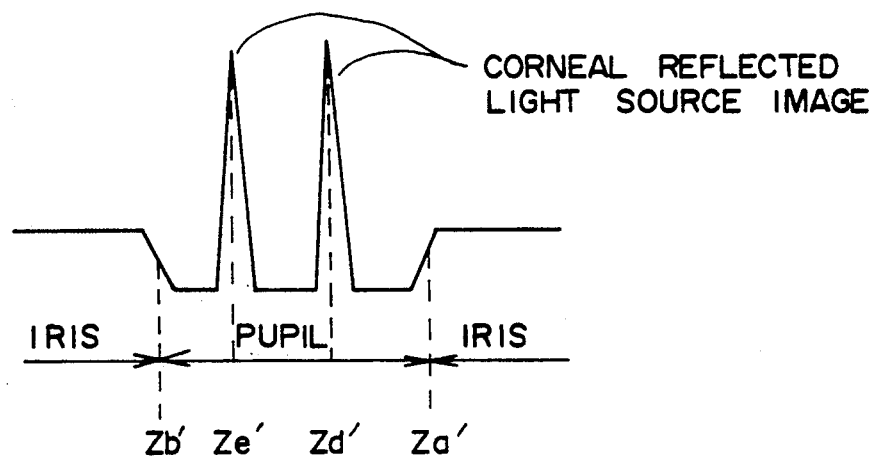
FIG. 4B shows the output from a detector.

FIG. 4 illustrates the principle of the visual axis detecting method, FIG. 4A being a schematic view of the visual axis detecting optical system, and FIG. 4B showing the intensity of the output of the image sensor 6. In FIG. 4A, the reference characters 5a and 5b designate light sources such as light emitting diodes which emit infrared light not sensed by the observer. The light sources are disposed substantially symmetrically in the Z direction with respect to the optical axis S and divergently illuminate the observer's eyeball.

The infrared light emitted from the light source 5b illuminates the cornea 21 of the eyeball. At this time, the reflected light source image d by part of the infrared light reflected by the surface of the cornea 21 is condensed by the light receiving lens 4 and is re-imaged at a position d' on the image sensor 6.

Likewise, the infrared light emitted from the light source 5a illuminates the cornea 21 of the eyeball. At this time, the reflected light source image e by part of the infrared light reflected by the surface of the cornea 21 is condensed by the light receiving lens 4 and is re-imaged at a position e' on the image sensor 6. Also, light beams from the end portions a and b of the iris 23 form the images of said end portions a and b at positions a' and b' on the image sensor 6 through the light receiving lens 4. Where the rotation angle $\theta$ of the optical axis T of the eyeball with respect to the optical axis of the light receiving lens 5 (the optical axis S) is small, when the Z coordinates of the end portions a and b of the iris 23 are Za and Zb, respectively, the coordinates Zc of the central position c of the pupil 24 are expressed as $Zc=(Za+Zb)/2$.

Also, the Z coordinates of the midpoint between the reflected light source images d and e and the Z coordinates Zo of the center of curvature O of the cornea 21 coincide with each other and therefore, when the Z coordinates of the created positions d and e of the reflected light source images are Zd and Ze, respectively, and the distance between the center of curvature 0 of the cornea 21 and the center C of the pupil 24 is OC, the rotation angle $\theta$ of the optical axis T of the eyeball substantially satisfies the following relational expression:

$$OC \cdot SIN\theta \approx Zc-(Zd+Ze)/2. \qquad (3)$$

Therefore, by detecting the positions of particular points (the reflected light source images d and e and the end positions a and b of the iris) projected onto portions of the image sensor 6 as shown in FIG. 4B, the rotation angle of the optical axis T of the eyeball can be found. At this time, expression (3) is rewritten into $$\beta \cdot Oc \cdot SIN\theta \approx (Za'+Zb')/2-(Zd'+Ze')/2, \qquad (4)$$

where $\beta$ is a magnification determined by the position of the eyeball relative to the light receiving lens 4 and is substantially a function of the interval $|Zd'-Ze'|$ between the reflected light source images by the cornea.

When the rotation angle $\theta$ of the observer's eyeball is calculated, the optical axis and visual axis of the eyeball are corrected, whereby the observer's visual axis is found. The calculation for finding the observer's visual axis as described above is executed by the software of the microcomputer of the calculation processing device 9 on the basis of the aforementioned expression (4).

Also, in FIG. 4, there is shown an example in which the observer's eyeball rotates in Z-X plane (for example, horizontal plane), but even where the observer's eyeball rotates in X-Y plane (for example, vertical plane), the visual axis is likewise detected, and in which of the areas $C_1$-$C_9$ in FIG. 8 the visual axis exists is detected for each sample pulse.

Figure 5:
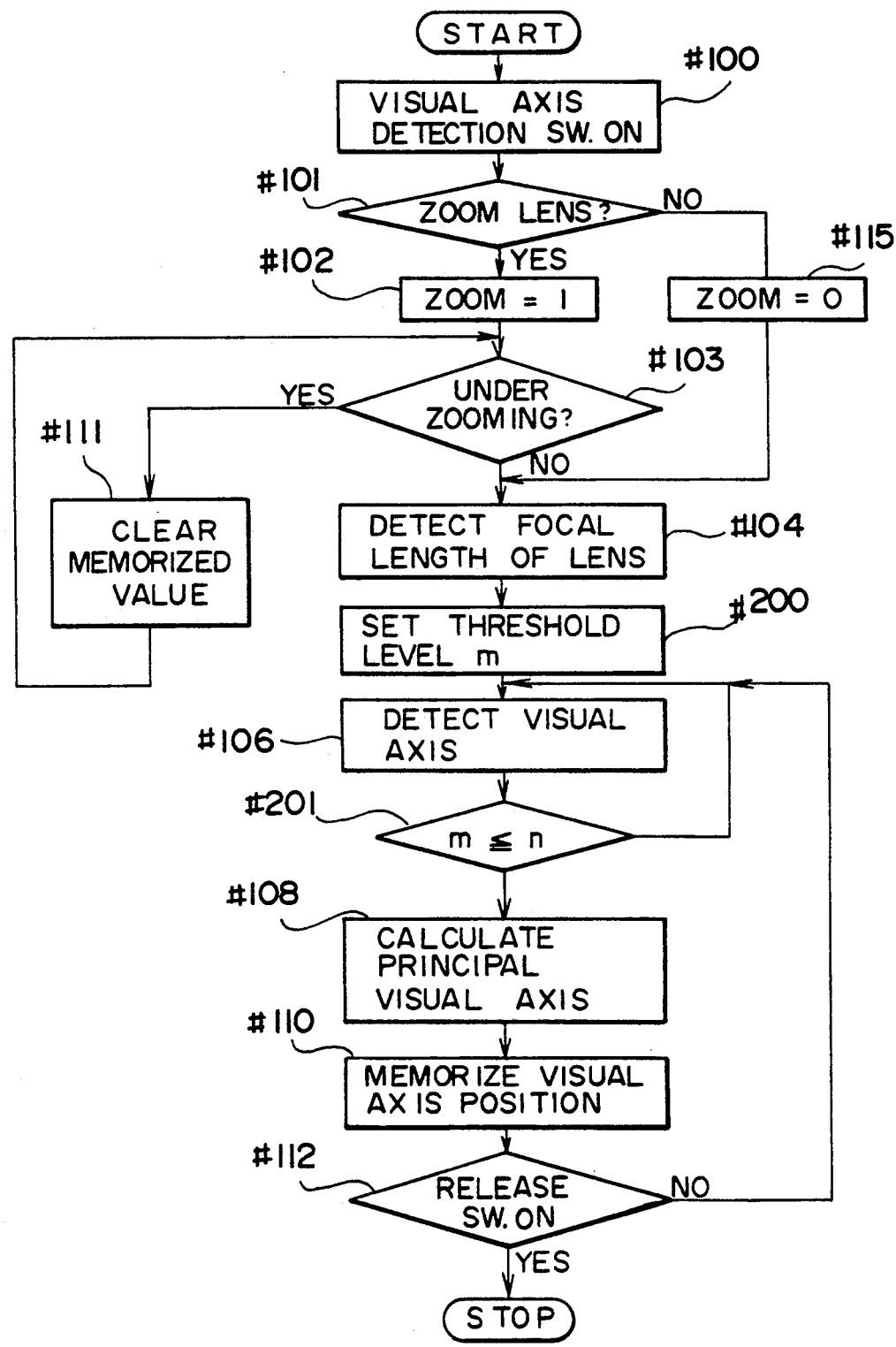
FIG. 5 is a flowchart of another embodiment.
Figure 6A:
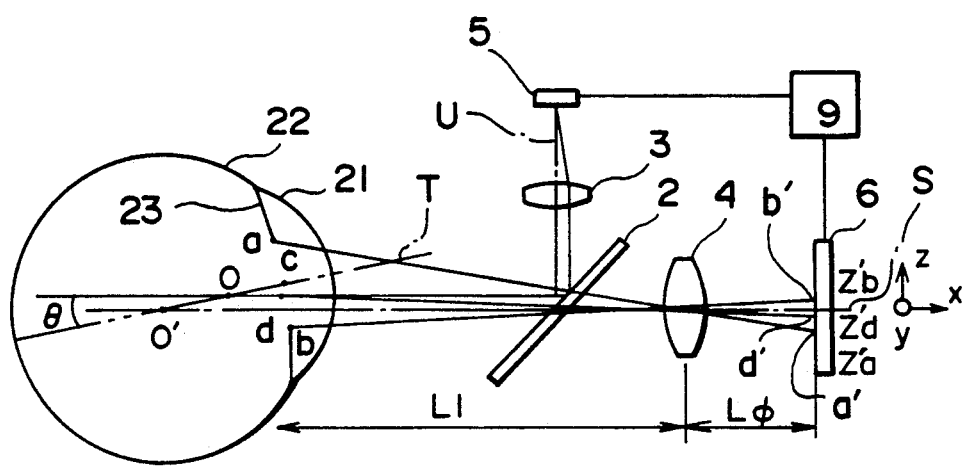
FIG. 6A illustrates a conventional visual axis detecting method.
Figure 6B:
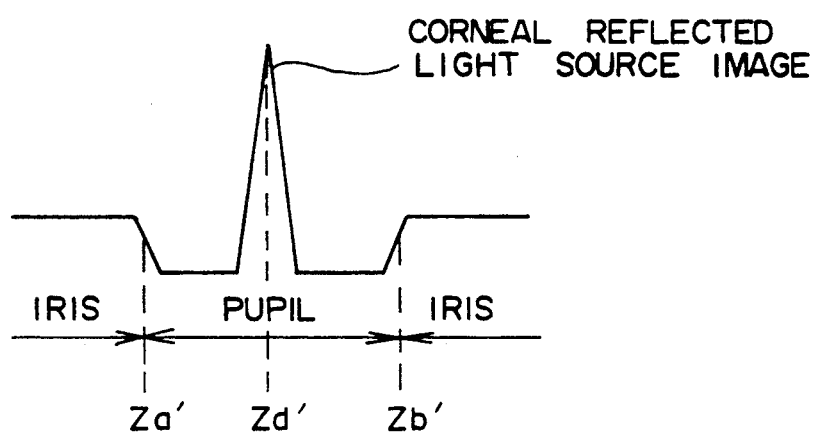
FIG. 6B shows the output from a detector.
Figure 7:
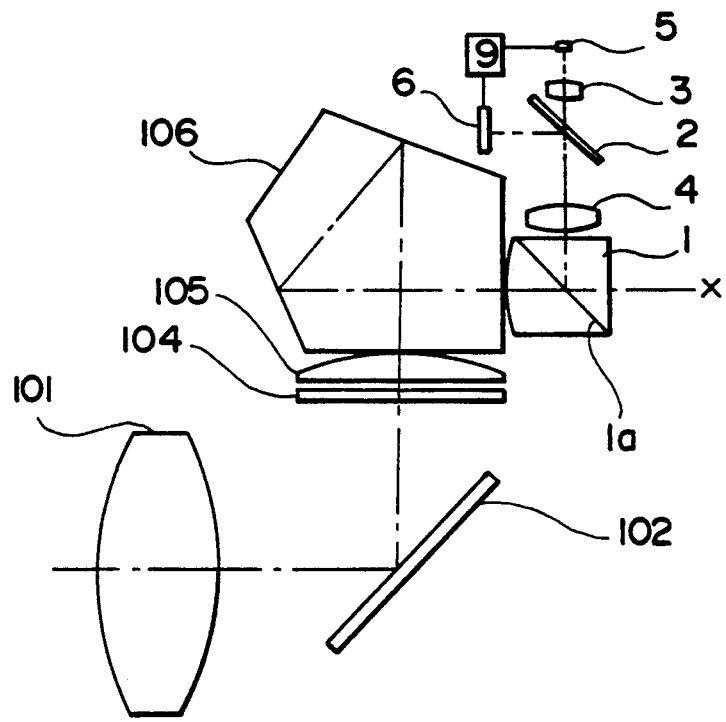
FIG. 7 is an optical cross-sectional view of a conventional single-lens reflex camera provided with a visual axis detecting device.

FIG. 5 is a flowchart showing a second embodiment of the present invention. In this figure, the same operation flows as those in the first embodiment of FIG. 3 are given the same reference characters and need not be described.

What is characteristic in the second embodiment is a step 200, where a threshold value m is set in conformity with the current focal length information of the phototaking lens 101 found at the step 104. In the first embodiment, the threshold value used to detect the principal visual axis is fixed, while the second embodiment is characterized in that this threshold value m is varied. That is, on the premise that the object to be photographed changes in conformity with the focal length of the photo-taking lens 101, when the focal length is short, the threshold value m is set to a small value (e.g. m=3), and when the focal length is long, the threshold value m is set to a great value (e.g. m=5).

When the threshold value m is set by the step 200, the camera control device 109 sends a visual axis detection starting signal to the calculation processing device 9 and visual axis detection is effected. The visual axis detection at the step 106 is one which, as in the case of FIG. 3, detects in which of the areas $C_1$-$C_9$ in FIG. 8 the visual axis exists, for each predetermined number of sampling pulses, and here again, a description will be made with the sampling pulses as 20 pulses for one second.

At a step 201, how many times of the predetermined number (20 pulses) the visual axis has been positioned in each of the areas $C_1$-$C_9$ is found, and one of the areas $C_1$-$C_9$ in which the number of times n over which the visual has actually been positioned has assumed the relation that m≦n to the threshold value m (3 or 5) is calculated as the principal visual axis position (the gaze visual axis) (#108). The number of the areas of the principal visual axis position is sometimes one, sometimes plural, and sometimes zero.

The subsequent operations are similar to those in the first embodiment of FIG. 3 and need not be described.

The idea of this second embodiment is that as regards the object to be photographed at the focal length on the wide angle side, the main object is often situated in a wide range as in a landscape photograph and accordingly, it is easier to recognize the main object accurately when the threshold value m is made small; while as regards the object to be photographed at the focal length on the telephoto side, the main object, like a person, often exists in a relatively narrow area and accordingly, it is easier to recognize the main object accurately when the threshold value m is made great.

Figure 9A:
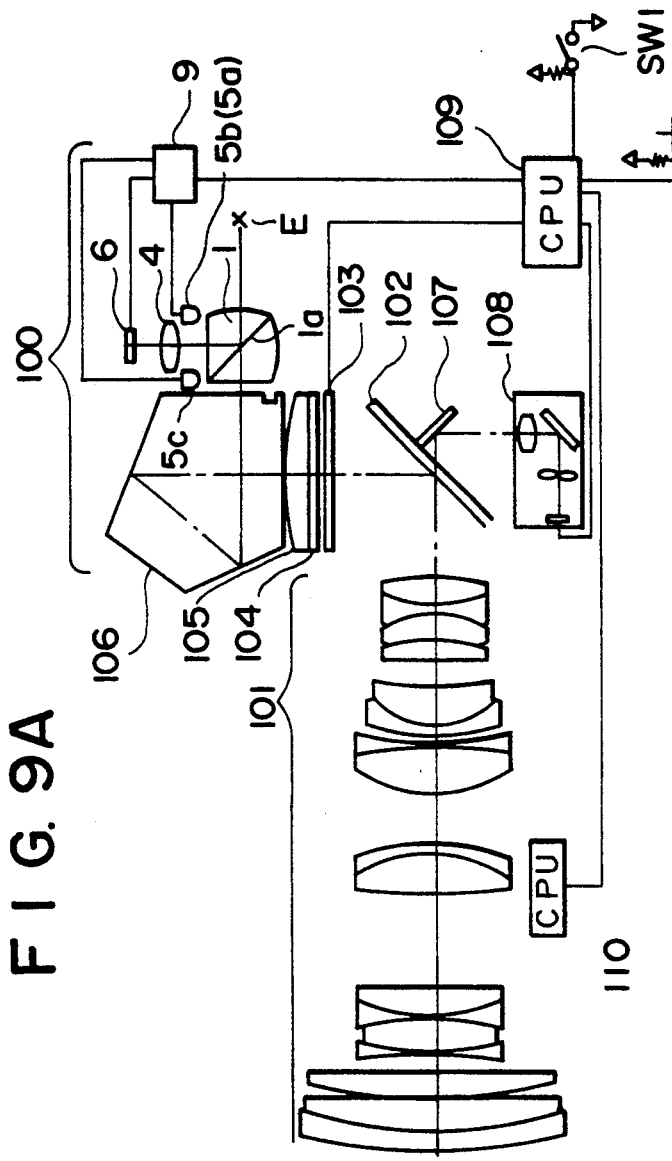
FIG. 9A is an optical cross-sectional view of another embodiment.
Figure 9B:
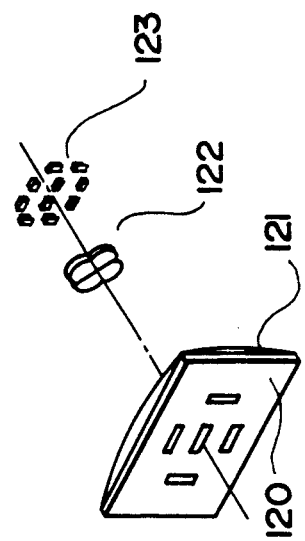
FIG. 9B is a perspective view of the optical arrangement of a focus detecting device.

FIG. 9 shows an embodiment of a camera of the type incorporating a lens therein, and in this embodiment, the contacts $C_1$ and $C_2$ in the camera of FIG. 1 is eliminated. In FIG. 9, members similar in construction to those in FIG. 1 are given similar reference characters and need not be described.

Figure 10:
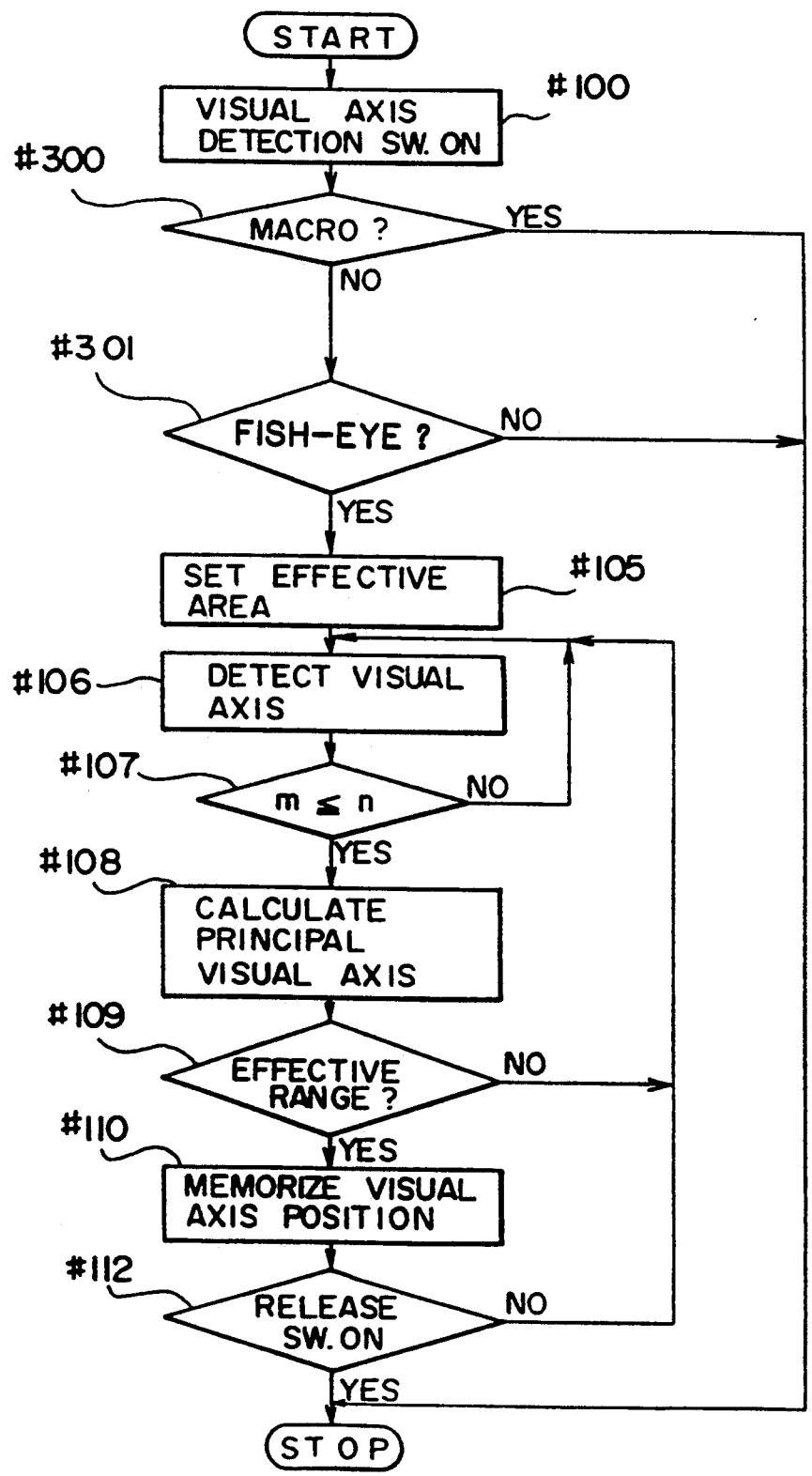
FIG. 10 is a flowchart of a third embodiment.

FIG. 10 shows a third embodiment of the present invention, and this embodiment is such that in the interchangeable lens system shown in FIG. 1, the type of the photo-taking lens is detected and visual axis detection is controlled.

In the flowchart of FIG. 10, steps similar in operation to those in the first embodiment of FIG. 3 are given similar reference characters and need not be described.

At a step 300, whether the mounted phototaking lens 101 is a macroscopic lens is judged, and if it is a macroscopic lens, the visual axis detecting operation is not performed. Actually, the camera control device 109 effects a communication with the lens control device 110 through the contacts $C_1$ and $C_2$, reads out the memorized information relating to the type of the lens, and judges whether the mounted lens is a macroscopic lens. The reason why the design is made such that if the mounted lens is a macroscopic lens, the subsequent operation regarding visual axis detection is not performed is that it is considered that in the case of macroscopic photographing, auto focusing by a multipoint technique is often not effected and photographing with the main object focused can be sufficiently accomplished even if the principal visual axis position is not found positively.

Subsequently, at a step 301, whether the type of the lens is the fish-eye type is discriminated, and the design is made such that only when the type of the lens is the fish-eye type, the operation regarding the visual axis detection of subsequent steps 105-112 is performed. This is because in the case of a fish-eye lens, the light beam in some marginal portion relative to the finder area is eclipsed and therefore, a better result is obtained if an effective area is set during the detection of the visual axis position.

Figure 11:
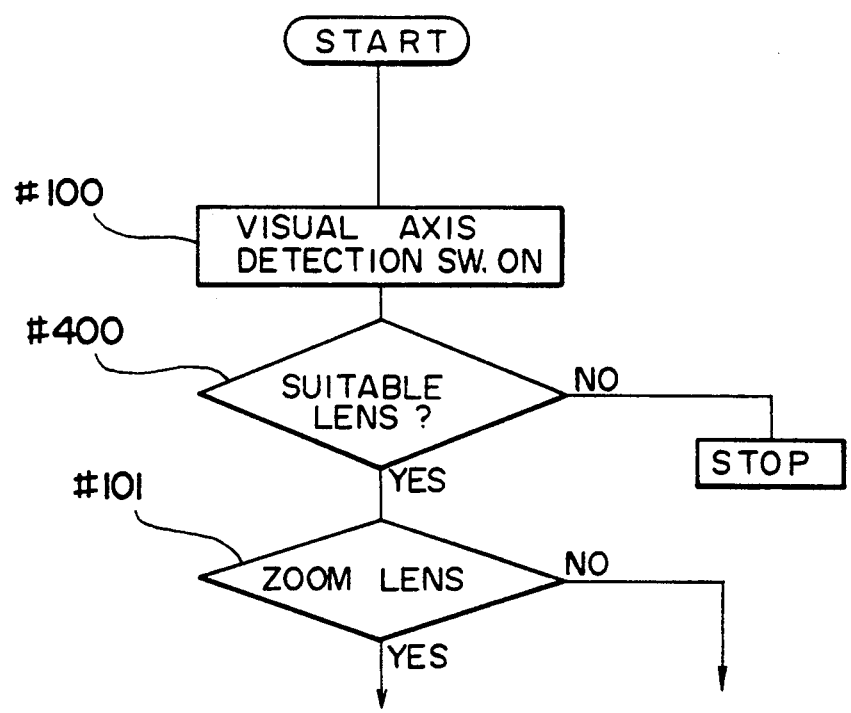
FIG. 11 is a partial flowchart of a fourth embodiment.

FIG. 11 shows a fourth embodiment of the present invention, and particularly shows the way of coping with a case where in the camera of the interchangeable lens system shown in FIG. 1, the photo-taking 101 is not an adequate lens (a case where the camera body 100 is of the AF type, whereas the lens mounted thereon is of the manual type) or a case where an interchangeable adapter, an intermediate tube, etc. are mounted between the photo-taking lens 101 and the camera body 100 and the camera body 100 cannot obtain lens information including the focal length information of the phototaking lens.

That is, only when at a step 400, the mounted lens is judged to be an adequate lens, advance is made to the subsequent step 101, and if the mounted lens is judged not be so, visual axis detection is stopped. In the flowchart of FIG. 11, steps similar to those in FIG. 3 or 5 are given similar reference characters and need not be described, and the steps subsequent to the step 101 may be the same as those in FIG. 3 or 5 and therefore are not shown.

In the present invention, the information of the mounted photo-taking lens is detected and in response to the detection output, the control of the visual axis detecting device is made to differ and therefore, matching between the photographing intention and visual axis detection can be achieved.

When by the use of focal length information as the information of the photo-taking lens, the effective area of visual axis detection or the threshold value during the extraction of the main object (the extraction of the principal visual axis) is varied in conformity with the value of this focal length, the detection of the position of the main object the photographer wants to photograph can be accomplished with good accuracy.

Also, when a macroscopic lens is mounted as the photo-taking lens, visual axis detection is often unnecessary and therefore, in that case, visual axis detection is not effected to thereby suppress any meaningless power consumption.

Also, when a fish-eye lens is mounted as the phototaking lens, the effective area of visual axis detection is made narrow, whereby the detection of the position of the main object can be accomplished with good accuracy.

Figure 12:
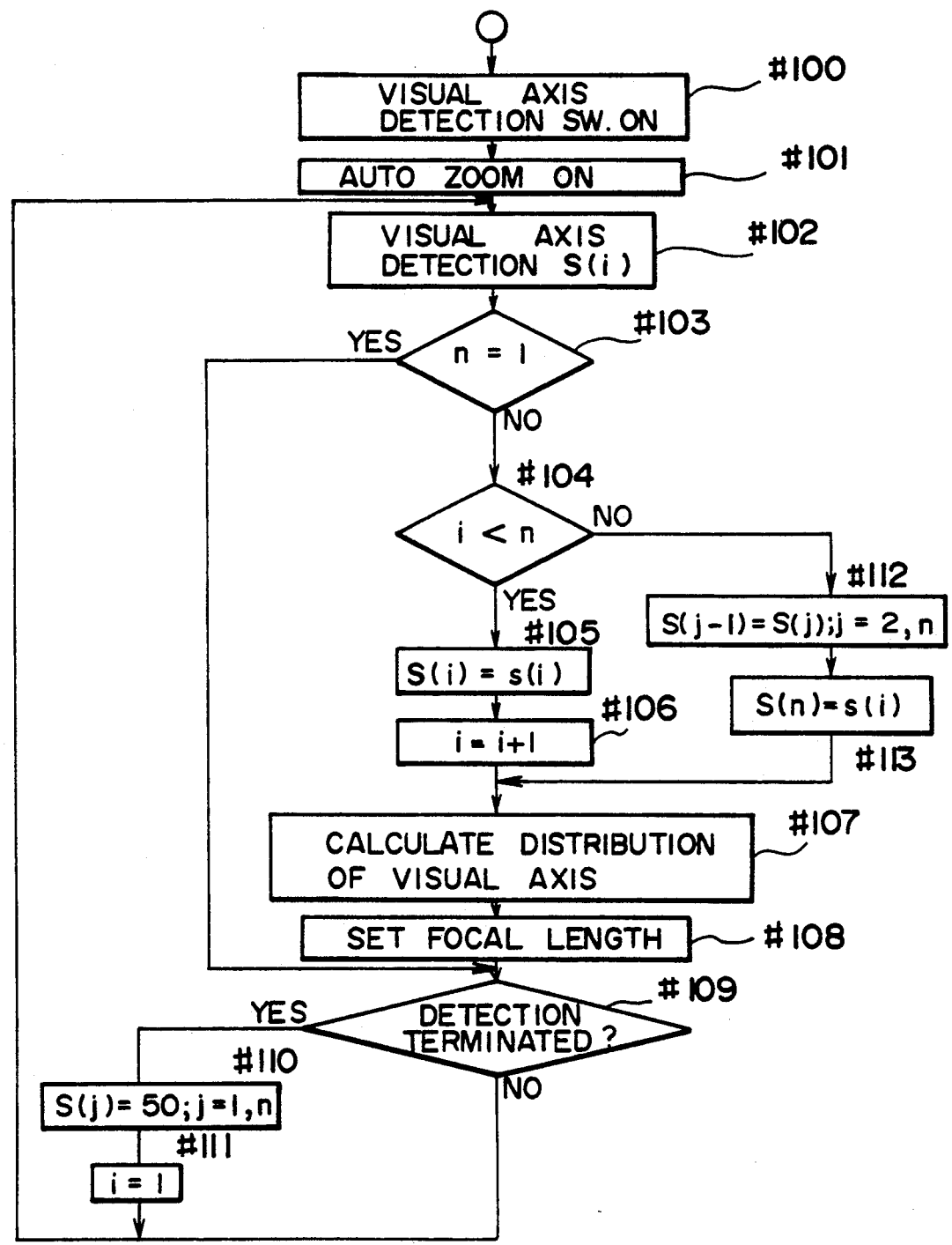
FIG. 12 is a flowchart of a fifth embodiment.

FIG. 12 is a flowchart in a case where the zooming adjustment of a zoom lens is effected so that the size of an object may be photographed in the same size irrespective of the distance to the object. The optical system in this case is similar to that shown in FIG. 1A and 2.

When a visual axis detection starting switch, not shown, attached to the camera body or the phototaking lens 101 is first closed (#100) and further a switch for auto zoom is closed (#101), the camera control device 109 sends a visual axis detection starting signal to the calculation processing device 9, whereby visual axis detection (data s(i)) is executed (#102). The threshold value n of the number of times of visual axis detection is preset in the calculation processing device 9, and when n=1 (#103), the auto zooming function does not work. The number of times n is 1 or greater value determined from a time, etc. required for extracting a main object to be photographed from the movement of the visual axis. Usually, in a case where the auto zooming function works, the threshold value n of the number of times of visual axis detection is set to a value greater than 1.

If the threshold value n of the number of times of visual axis detection is greater than 1 (#103) and the number of times i of visual axis detection is smaller than a predetermined number of times n (#104), the visual axis detection data s(i) is memorized as data S(i) in the memory portion of the calculation processing device 9 (#105). Further, the calcuation processing device 9 counts up the number of times i of visual axis detection (#106), and calcualates the distribution of the visual axis on the basis of the data S(i) memorized in the memory portion (#107). Also, if the number of times i of visual axis detection is equal to the predetermined number of times n (#104), the data S so far memorized in the calculation processing device 9 is replaced by S(j-1)=S(j) (j assumes a value of 2 to n) (#112), and the latest visual axis detection data s(i) is memorized as data S(n) in the calculation processing device 9 (#113). The distribution of the visual axis is calculated on the basis of the replaced and memorized data S(i) (#107). Further, the calculation processing device 9 sets the focal length on the wide-angle side if the calculated distribution of the visual axis is uniform, for example, over the entire photographing image field, and sets the focal length on the telephoto side if the visual axis concentrates upon one point in the photographing image field (#108).

Also, the focal length information set in the calculation processing device 9 is sent to the lens control device 110 through the camera control device 109. In the lens control device 110, the focal length is changed on the basis of the focal length information.

If during that time, the photographer has closed the shutter release switch, the camera control device 109 sends a visual axis detection stopping signal to the calculation processing device 9 to thereby stop visual axis detection (#109). Further, the data S(j) (j assumes a value of 1 to n) so far memorized in the calculation processing device 9 is cancelled, or a value which will be recognized as an error of detection, for example, a numerical value such as 50, is substituted for (#110), the number of times i of visual axis detection is set to 1 (#111), and visual axis detection is continued (#102).

Also, if visual axis detection is not stopped (#109), visual axis detection is continued (#102).

In the present embodiment, there has been shown a method of setting the loading distance of the zoom lens from the visual axis information of the photographer. Alternatively the distance information of the object may be added to thereby synthetically set the focal length.

In the above-described embodiments, only a device using the through-the-lens TTL type passive method has been described as the focus detecting device, but the present invention can also be applied to a device using the active method which is attached to the casing of a camera body.

The present invention is not restricted to the previously described embodiments, but can be expressed as various embodiments.

What is claimed is:

1. A camera comprising:
   observation means for observing a scene therethrough;
   visual axis detecting means for detecting the visual axis direction of the eye of an operator looking into said observation means;
   information receiving means for receiving the information of an objective lens; and
   control means for making the control of said visual axis detecting means differ on the basis of a signal from said information receiving means.

2. A camera according to claim 1, wherein the information of said objective lens relates to the focal length thereof, and said control means varies the effective area of visual axis detection.

3. A camera according to claim 1, wherein the information of said objective lens relates to the focal length thereof, and said control means varies a threshold value for judging the principal visual axis direction.

4. A camera according to claim 2, wherein said objective lens is a zoom lens.

5. A camera according to claim 3, wherein said objective lens is a zoom lens.

6. A camera according to claim 2, wherein said objective lens is an interchangeable lens.

7. A camera according to claim 3, wherein said objective lens is an interchangeable lens.

8. A camera according to claim 1, wherein the information of said objective lens shows that said lens is a lens of a predetermined type.

9. A camera according to claim 8, wherein said control means prohibits said visual axis detecting means from detecting the visual axis.

10. A camera according to claim 8, wherein said control means varies the effective area of visual axis detection.

11. A camera comprising:
   observation means for observing a scene therethrough;
   visual axis detecting means for detecting the visual axis direction of the eye of an operator looking into said observation means;

an objective lens the focal length of which can be varied;

an actuator for varying the focal length of said objective lens; and control means for controlling said actuator on the basis of the output of said visual axis detecting means.

12. A camera according to claim 11, wherein said control means determines the tendency of the focal length on the basis of the distribution of the visual axis detected by said visual axis detecting means during a predetermined detection time.

13. A camera according to claim 12, wherein when the distribution of the visual axis spreads over the entire image field, the focal length is set to the wide-angle side, and when the distribution of the visual axis converges, the focal legnth is set to the telephoto side.

14. A camera having an objective lens removably mounted thereon or second thereto, said camera comprising:

observation means for observing a scene through said objective lens;

visual axis detecting means for detecting the visual axis direction of the eye of an operator looking into said observation means;

information receiving means for receiving the information of said objective lens; and control means for changing a judgement condition in a signal processing process for determining the visual axis direction in said visual axis detecting means on the basis of a signal from said information receiving means.

15. A camera according to claim 14, wherein the information of said objective lens relates to the focal length thereof, and said control means varies the effective area of visual axis detection.

16. A camera according to claim 14, wherein the information of said objective lens relates to the focal length thereof, and said control means varies a threshold value for judging the principal visual axis direction.

17. A camera according to claim 14, wherein the information of said objective lens shows that said lens is a lens of a predetermined type.

18. A camera according to claim 17, wherein said control means prohibits said visual axis detecting means from detecting the visual axis.

19. A camera according to claim 17, wherein said control means varies the effective area of visual axis detection.

* * * * *

UNITED STATES PATENT AND TRADEMARK OFFICE
CERTIFICATE OF CORRECTION

PATENT NO. : 5,245,371

DATED : September 14, 1993

INVENTOR(S) : Akihiko Nagano, et al.

It is certified that error appears in the above-indentified patent and that said Letters Patent is hereby corrected as shown below:

COLUMN 2:

line 52, "manner" should read --manner,--.

COLUMN 3:

line 16, "lenses" should read --lens--;
    line 22, "zoom a zooms" should read --zooms a zoom--; and
    line 26, "beer" should read --been--.

COLUMN 5:

line 11, "an" should read --a--.

COLUMN 6:

line 58, "pules." should read --pulses.--; and
    line 60, "pules" should read --pulses--.

COLUMN 7:

line 44, "flow chart" should read --flowchart--;
    line 54, "This," should read --This--;
    line 62, "telephoto, size" should read --telephoto size,--;
    line 65, "area" should read --areas--; and
    line 66, "area" should read --areas--.

UNITED STATES PATENT AND TRADEMARK OFFICE
CERTIFICATE OF CORRECTION

PATENT NO. : 5,245,371
DATED : September 14, 1993
INVENTOR(S) : Akihiko Nagano, et al It is certified that error appears in the above-indentified patent and that said Letters Patent is hereby corrected as shown below:

COLUMN 8:

line 37, "Zc=(Za+Zb)/2." should read
--Zc=(Za+Zb)/2.--.

COLUMN 9:

line 65, "is" should read --are--.

COLUMN 10:

line 46, "phototak-" should read --photo-tak- --; and
line 51, "not be so," should read --not to be so,--.

COLUMN 12:

line 13, "Alternatively" should read
--Alternatively,--.

Signed and Sealed this

Twenty-first Day of February, 1995

Attest:

BRUCE LEHMAN

Attesting Officer        Commissioner of Patents and Trademarks